Oct. 7, 1941. G. M. LONG 2,257,970
TRAY FOR WATERMELONS
Filed July 10, 1940
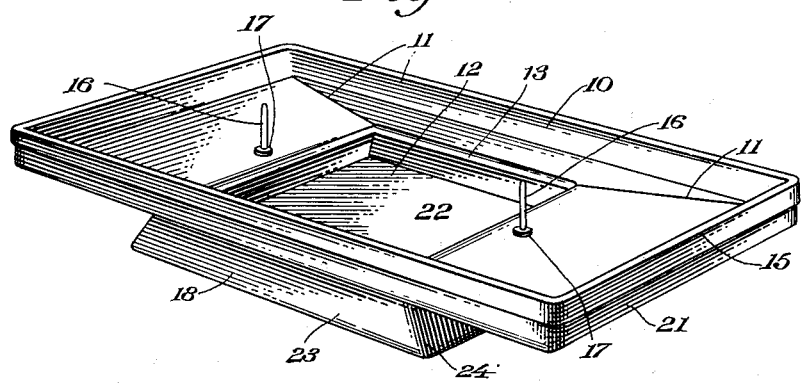
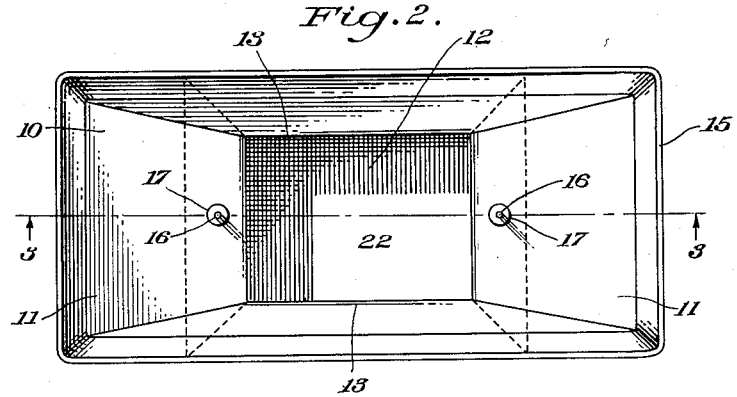
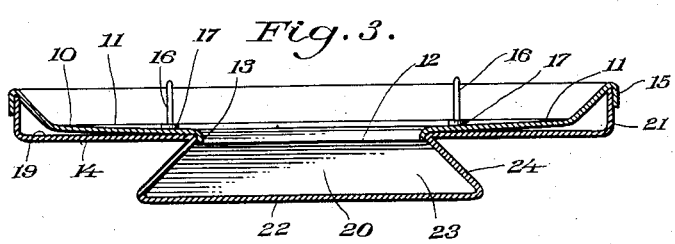
George M. Long:
INVENTOR
BY Victor J. Evans & Co.
ATTORNEYS Patented Oct. 7, 1941

2,257,970

UNITED STATES PATENT OFFICE 2,257,970

TRAY FOR WATERMELONS

George M. Long, Canton, Miss.

Application July 10, 1940, Serial No. 344,789

1 Claim. (Cl. 65—15)

This invention relates to a tray for watermelons and has for an object to provide a tray that can be used by a person in an automobile to eat a slice of watermelon in his automobile without getting the juice on his clothes or automobile upholstery.

A further object of the invention is to provide a tray having its upper portion slanted, to allow the juice of a watermelon to drain through the lower portion into a receptacle which may be easily emptied, taken apart, and cleaned.

A further object of the device is to provide a tray having a pair of prongs extending upwardly from the bottom of the tray at opposite sides of the receptacle to secure a slice of watermelon on the tray.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a perspective view of the device.

Figure 2 is a top plan view of the device.

Figure 3 is a sectional view of the device taken on the line 3—3 of Figure 2, looking in the direction of the arrows.

Referring now to the drawing in which like characters of reference designate similar parts in the various views, 10 designates a tray substantially of elongated rectangular formation in plan. The tray 10 has its inner sides 11 inclined toward a square central opening 12 in the bottom 14 of the tray. The peripheral edge portions of the opening are bent downwardly to form a rim 13. A rim 15 is formed on the outer edge of the tray 10. A pair of prongs 16 extend upwardly from the bottom of the tray 10 on opposite sides of the square opening 12 of the tray. A stop collar 17 is secured to each prong to limit insertion of the lower end of the prong into a respective opening in the bottom 14 of the tray 10.

A receptacle 18 is disposed underneath the tray and is substantially of elongated rectangular formation in plan. The top 19 of the receptacle is flat and has a square central opening 20 registering with the opening 12 of the tray. The outer edges of the top 19 of the receptacle are bent upwardly to form a rim 21. The bottom 22 of the receptacle 18 is provided with side walls 23 and end walls 24 which incline downwardly and outwardly from the opening 20 in the top 19 of the receptacle.

In operation the tray 10 is fitted on the top 19 of the receptacle 18, which latter is arranged centrally with relation to the tray 10 with its longitudinal axis coincident with the longitudinal axis of the tray 10. The outer rim 15 of the tray fits down upon and overlaps the rim 21 of the receptacle and the inner rim 13 of the tray fits down into the opening in the top of the receptacle, and snugly engages the upper portion of the side and end walls of the receptacle to removably and securely hold the tray 10 to the receptacle 18.

The receptacle 18 is provided with side walls 23 and end walls 24 which incline downwardly and outwardly. Thus any juices, seeds and waste from a slice of watermelon supported on the pair of prongs 16 would be directed downwardly from the inclined walls 11 of the tray 10 through the opening 12 of the tray 10 into the opening 20 of the receptacle 18 to the side walls 23 and end walls 24 to the flat bottom 22.

From the above description it is thought that the construction and operation of the invention will be fully understood without further explanation.

What is claimed is:

A tray for serving sliced watermelon comprising, a tray provided with a receptacle extending downwardly from the bottom, said receptacle being open at its upper side, said tray having an opening in the bottom registering with the open upper side of the receptacle, a rim formed on the edges of the opening in the tray fitting down into the opening in the top side of the receptacle, a rim on the outer edges of the receptacle, a rim on the outer edges of the tray fitting down upon and overlapping the rim on the outer edges of the receptacle to keep the tray from shifting, and a pair of prongs secured to the upper surfaces of the tray opposite one another at the opening to secure a piece of sliced watermelon to the tray.

GEORGE M. LONG.